(12) United States Patent
Charpin-Nicolle et al.

(10) Patent No.: US 12,120,889 B2
(45) Date of Patent: Oct. 15, 2024

(54) METHOD FOR MANUFACTURING A MICROELECTRONIC DEVICE COMPRISING A PLURALITY OF RESISTIVE MEMORY POINTS CONFIGURED TO FORM A PHYSICAL UNCLONABLE FUNCTION AND SAID DEVICE

(71) Applicant: COMMISSARIAT À L'ÉNERGIE ATOMIQUE ET AUX ÉNERGIES ALTERNATIVES, Paris (FR)

(72) Inventors: Christelle Charpin-Nicolle, Grenoble (FR); Florian Pebay-Peyroula, Grenoble (FR); Rémy Gassilloud, Grenoble (FR); Nicolas Guillaume, Grenoble (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 297 days.

(21) Appl. No.: 17/533,545

(22) Filed: Nov. 23, 2021

(65) Prior Publication Data
US 2022/0165792 A1 May 26, 2022

(30) Foreign Application Priority Data
Nov. 23, 2020 (FR) .................. FR2012006

(51) Int. Cl.
*H10B 63/00* (2023.01)
*H04L 9/32* (2006.01)
*H10N 70/00* (2023.01)

(52) U.S. Cl.
CPC .......... *H10B 63/80* (2023.02); *H04L 9/3278* (2013.01); *H10N 70/011* (2023.02); *H10N 70/841* (2023.02); *H10N 70/8833* (2023.02)

(58) Field of Classification Search
CPC ...................................... H10B 63/80
(Continued)

(56) References Cited

U.S. PATENT DOCUMENTS

2017/0345492 A1* 11/2017 Yoshimoto ............... G11C 7/24
2017/0373015 A1* 12/2017 Yano ....................... H01L 22/20
(Continued)

FOREIGN PATENT DOCUMENTS

EP         3 796 390 A1    3/2021
WO    WO 2018/175973 A1    9/2018

OTHER PUBLICATIONS

Search Report as issued in French Patent Application No. 2012006, dated Aug. 11, 2021.
(Continued)

*Primary Examiner* — Sung Il Cho
(74) *Attorney, Agent, or Firm* — Pillsbury Winthrop Shaw Pittman LLP

(57) ABSTRACT

A method for manufacturing a microelectronic device including resistive memory points, a first portion of the memory points forming a physical unclonable function, the memory points of the first portion forming a PUF zone, a second portion of the memory points providing a memory function, the memory points of the second forming a memory zone, the method including providing a support including a first electrode layer and an active oxide resistive memory layer; etching the active oxide resistive memory layer in the PUF zone; etching the active oxide resistive memory layer in the memory zone, the etching in the memory zone producing a dispersion of roughness of the oxide layer less than the dispersion of roughness produced by the etching in the PUF zone; depositing a second elec-
(Continued)

trode layer; etching the second electrode layer, the active oxide layer and the first electrode layer to define the memory points.

11 Claims, 5 Drawing Sheets

(58) Field of Classification Search
USPC .......................................................... 365/148
See application file for complete search history.

(56) References Cited

U.S. PATENT DOCUMENTS

| | | | |
|---|---|---|---|
| 2018/0277198 A1* | 9/2018 | Tseng | G11C 17/16 |
| 2020/0044872 A1* | 2/2020 | Willsch | H04L 9/3278 |
| 2021/0305499 A1* | 9/2021 | Xie | H10N 50/10 |
| 2021/0377058 A1* | 12/2021 | Froment | H03K 19/003 |

OTHER PUBLICATIONS

Tseng, P.-H., et al., "Error free physically unclonable function with programmed resistive random access memory using reliable resistance states by specific identification-generation method," Japanese Journal of Applied Physics, vol. 57, No. 4S, Mar. 2018, 7 pages.

* cited by examiner

[Fig. 1]
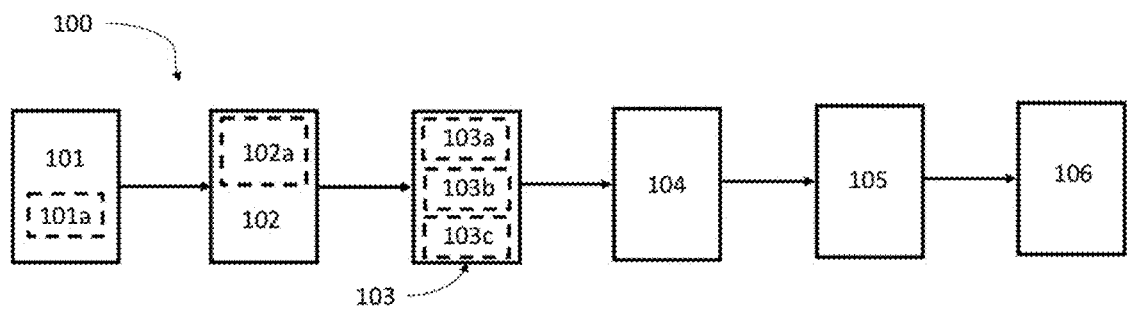
[Fig. 2]
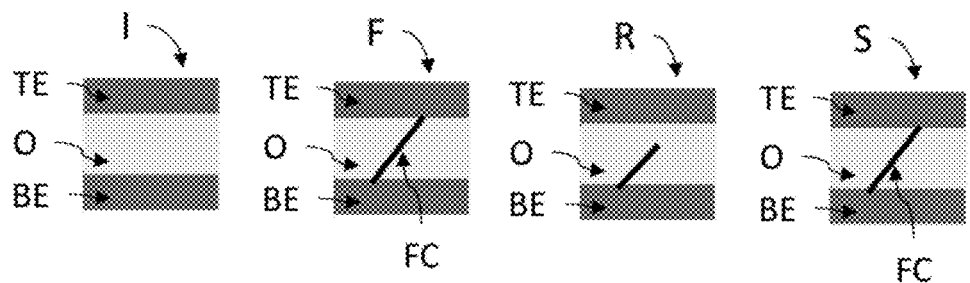
[Fig. 3]
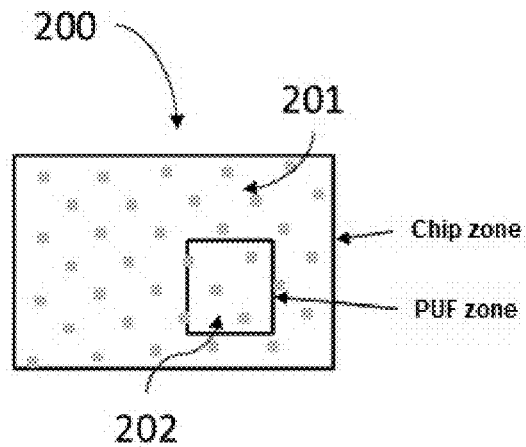

[Fig. 4]
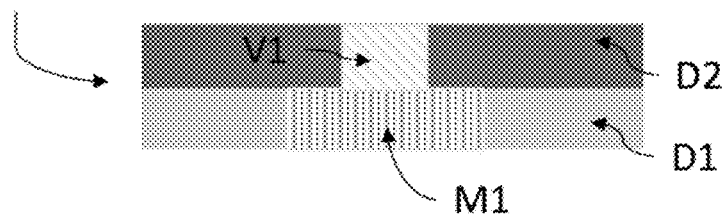
[Fig. 5]
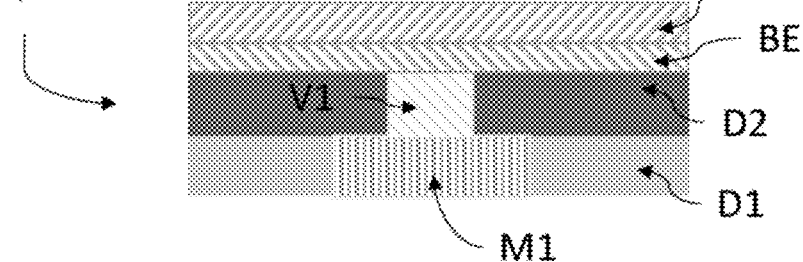
[Fig. 6a]
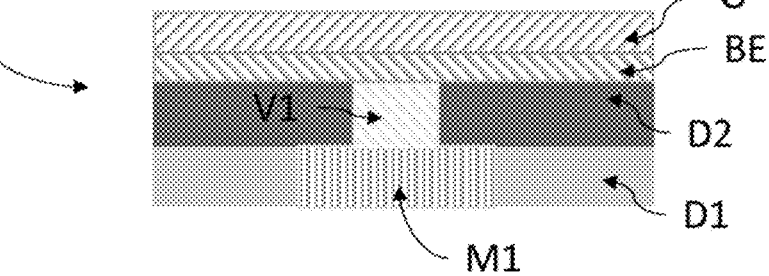
[Fig. 6b]
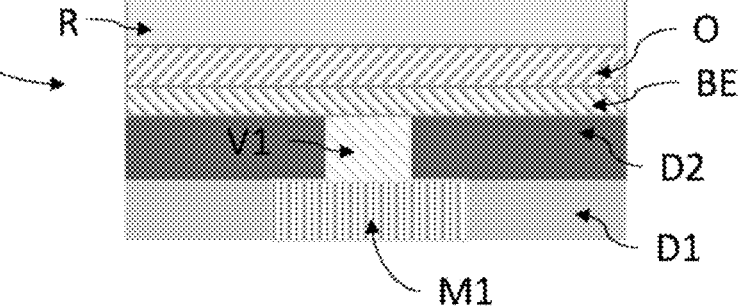

[Fig. 7a]
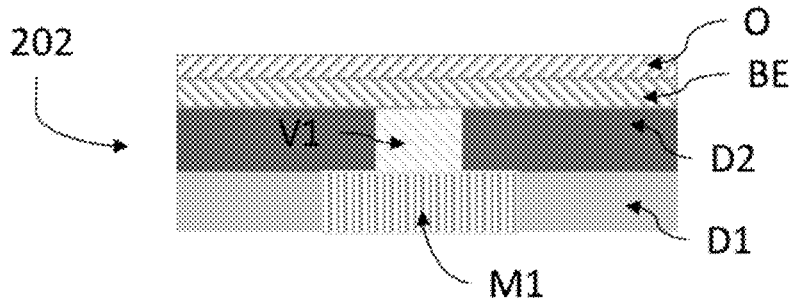
[Fig. 7b]
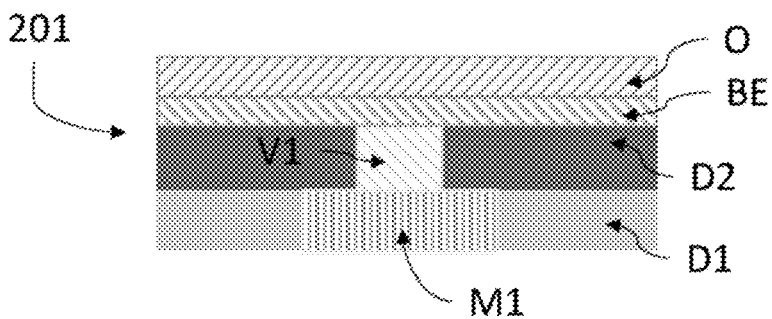
[Fig. 8a]
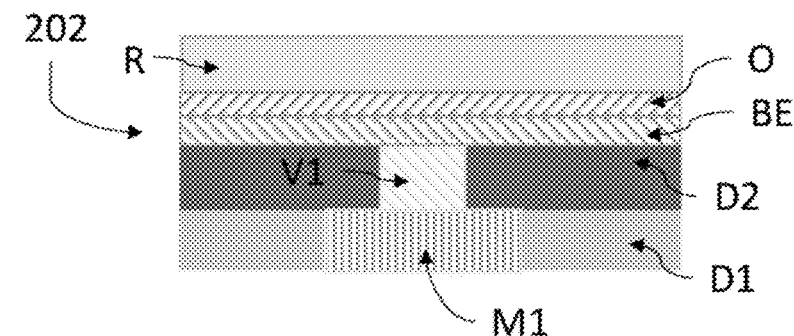
[Fig. 8b]
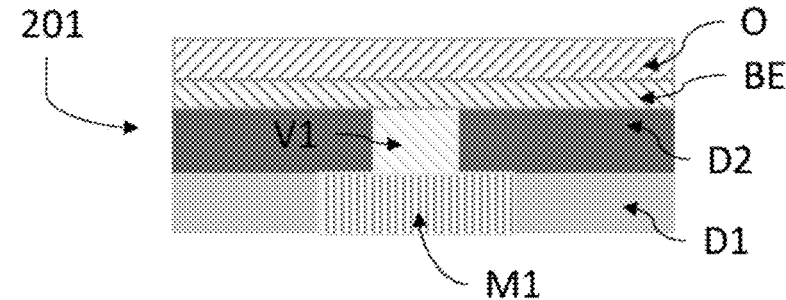

[Fig. 9a]
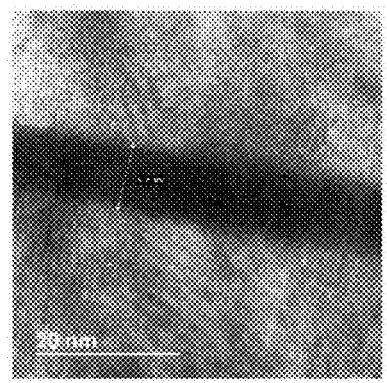
[Fig. 9b]
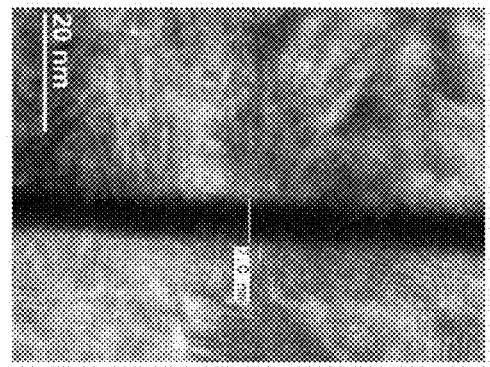
[Fig. 10a]
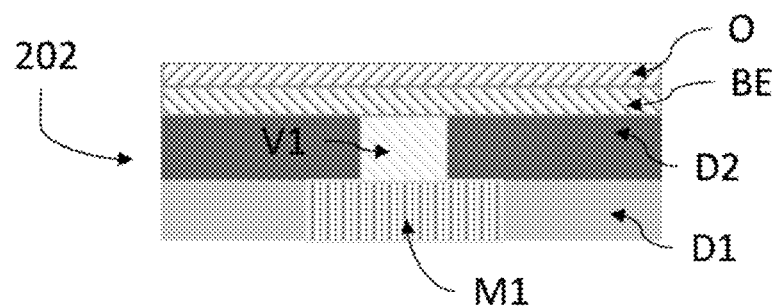
[Fig. 10b]
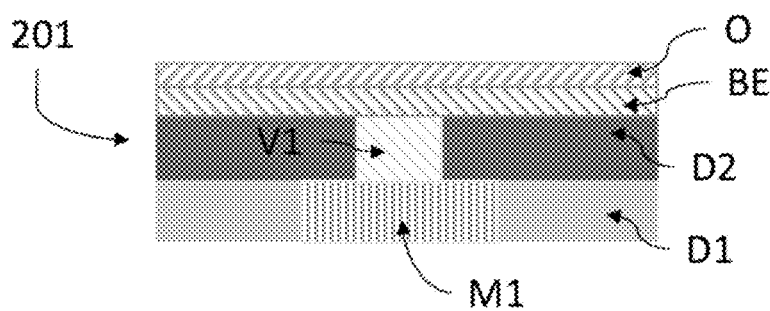

[Fig. 11a]
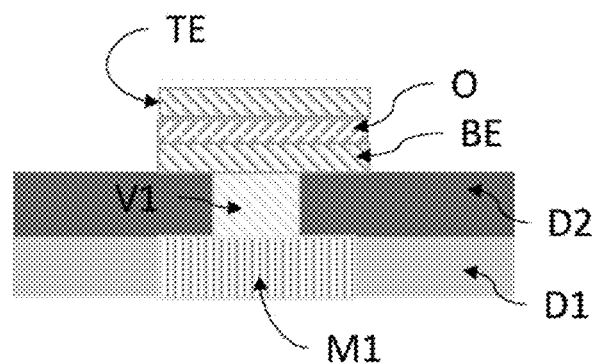
[Fig. 11b]
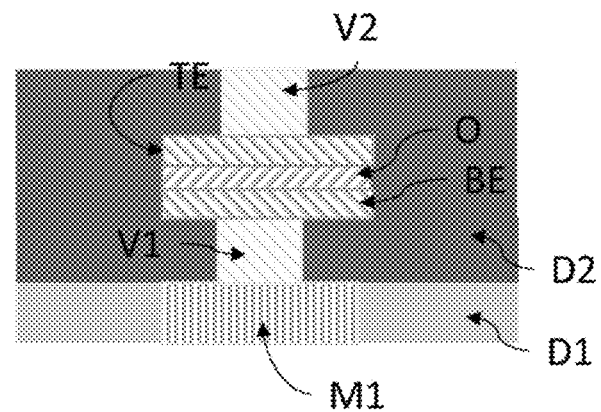

US 12,120,889 B2

METHOD FOR MANUFACTURING A MICROELECTRONIC DEVICE COMPRISING A PLURALITY OF RESISTIVE MEMORY POINTS CONFIGURED TO FORM A PHYSICAL UNCLONABLE FUNCTION AND SAID DEVICE

CROSS-REFERENCE TO RELATED APPLICATIONS

This application claims priority to French Patent Application No. 2012006, filed Nov. 23, 2020, the entire content of which is incorporated herein by reference in its entirety.

FIELD

The invention belongs to the field of microelectronic devices comprising a physical unclonable function. An object of the invention is a method for manufacturing a microelectronic device comprising a physical unclonable function as well as a storage memory. Another object of the invention is the microelectronic device obtained using the method according to the invention.

BACKGROUND

Counterfeiting integrated electronic circuits, or chips, is today a major problem for which the response in terms of a solution of protection is not yet mature or effective. Combatting counterfeiting of chips is a major challenge for the microelectronics industry.

To combat counterfeiting, solutions are sought that make it possible to authenticate a circuit so as to be able to discriminate whether or not it is a legitimate circuit, successful authentication, or a counterfeit circuit, failed authentication. A first method consists of using a unique ID for each circuit and having a database of legitimate IDs. However, it is very simple to emulate—replay—a valid ID thanks to a piece of hardware or software. The unique ID is therefore not a viable solution because it does not provide protection from replay attacks.

Another mechanism, very widely used in the field of information security, is that of "challenge-response". This mechanism allows for authentication while providing protection from a replay attack. A user who wants to authenticate a device using this mechanism will have to carry out the following steps:
  the user generates a random number N, N being the challenge;
  the user sends N to the circuit;
  the circuit calculates R=F(N) from a secret function F, R being the response;
  the circuit responds R to the user;
  the user compares R with the expected response, if there is equality the authentication has succeeded.

In order for the "challenge-response" method to be applicable to a given device, it is necessary that the producer carry out a so-called "enrolment" step when leaving the factory, consisting of constructing a database that contains legitimate "challenge-response" pairs for the given device. Concretely, for each integrated circuit, the tester will generate a certain number of challenges N, send them to the circuit, retrieve each response R and will record in a database the N-R pairs. All throughout the life cycle of the chip, a user will be able to authenticate the integrated circuit by carrying out the following steps:

they ask the manufacturer fora challenge N from the database;
  the chip calculates the response R=F(N);
  the user or the manufacturer compares this response with the one stored in the database;
  the "challenge-response" pair is deleted from the database in order to prevent replay.

This authentication unfolds through a secure protocol between the database and the integrated circuit. The authentication solution is based on an essential element: the function F. This function has to be unique at each chip and unclonable. This is then referred to as physical unclonable function (PUF), because a hacker must not be able to physically recreate the function otherwise they would be able to create a legitimate clone of the PUF and therefore of the circuit.

A PUF function must therefore have several characteristics among which an uncontrolled manufacturing process, very high inter-chip variability and a low intra-chip variability.

Existing PUF functions are based on uncontrolled physical elements. For example one of the very first PUFs (non-silicon) is based on bubbles of air that are found in a molten plastic.

Several techniques have been proposed to obtain PUFs in the field of microelectronics. Mention can be made for example of the techniques that intervene at the integrated circuit case such as "coating" PUFs or "magnetic" PUFs based on the random distribution of resistive or magnetic particles.

Other techniques intervene at the component and are essentially based on the dispersion of physical characteristics. Among the integrated circuits that contain a PUF function known to those skilled in the art, mention can be made of those that make use of signal propagation times, such as ring circuits or arbitration circuits. Alternatively, it is possible to make use of the instabilities at start-up for example in devices of the Static Random-Access Memory or SRAM type.

A known implementation of the PUF technology in the field of resistive memories is described in the publication "Error free Physically Unclonable Function (PUF) with programmed ReRAM using reliable resistance states by Novel ID-Generation method" (Tseng et al.—International Conference on Solid State Devices and Materials 2017). The latter is based on the use of a matrix of ReRAM rewritable non-volatile resistive memories such as memories containing an active metal oxide zone (OxRAM, or "Oxide Resistive RAM"). These memories are memories of the resistive type, i.e. they can have at least two resistance states, corresponding to a high resistance state (HRS) and to a low resistance state (LRS), upon application of a voltage. The voltage required to switch from an HRS state to an LRS state corresponds to the formation of a conductive filament that connects the two electrodes of each resistive memory point and is also called "forming" voltage.

The method known to those skilled in the art consists of applying a given range of voltages; due to the dispersion of the physical parameters of the memory points a random matrix of formed and non-formed memory points is obtained.

Although this method makes it possible to obtain a PUF function in a plane of ReRAM memories, the implementation thereof is complicated due to the very narrow range in the interruption of the formation of the memory points. This risks strongly reducing the random nature of the PUF device by thus increasing the risk of counterfeiting.

Therefore, today there is no method for manufacturing a microelectronic device that integrates a PUF function and a memory storage function that is reliable and of simple realisation, while still providing integrated circuits of which the counterfeiting is very difficult.

SUMMARY

An aspect of the invention aims to resolve the problems mentioned hereinabove at least partially by proposing a method for manufacturing a microelectronic device comprising two different etching techniques, one intended for the PUF portion of the device and providing a high dispersion of the physical parameters of the memory points, the other intended for the storage memory portion of the device and providing a repeatability of the performance of the memories that is as high as possible.

For this purpose, a first aspect of the invention is a method for manufacturing a microelectronic device comprising a plurality of resistive memory points, a first portion of the resistive memory points being configured to form a physical unclonable function PUF, the resistive memory points of the first portion forming a PUF zone of the device, a second portion of the resistive memory points being configured to provide a memory function to the microelectronic device, the resistive memory points of the second portion forming a memory zone of the device, the method for manufacturing comprising the following steps:

providing a support comprising a first electrode layer and an active oxide resistive memory layer;
etching of the active oxide resistive memory layer in the PUF zone of the device;
etching of the active oxide resistive memory layer in the memory zone of the device, the etching in the memory zone of the device being carried out in such a way as to produce a dispersion of roughness of the oxide layer less than the dispersion of roughness produced by the etching in the PUF zone of the device;
deposition of a second electrode layer;
etching of the second electrode layer, of the active oxide layer and of the first electrode layer and in such a way as to define the plurality of resistive memory points.

The term "portion of the support corresponding to the PUF memory points" means the portion of the device intended for providing the PUF function. This portion of the device is also called PUF zone or PUF portion of the device. The storage memory is also called memory zone or outside-PUF zone of the device.

The surface roughness of the dielectric layer portions can be measured by a means deviation value of roughness Ra or a value of the profile maximum height Rmax determined by means of 1 µm by 1 µm images measured by AFM (Atomic Force Microscopy).

A dispersion of roughness can generally be a dispersion of a means deviation value of roughness Ra of the dielectric layer portions or of a value of the profile maximum height Rmax of the dielectric layer portions, such as a standard deviation of the mean deviation value of roughness Ra or of the value of the profile maximum height Rmax for the dielectric layer portions. These values can be determined from 1 µm by 1 µm images from atomic force microscopy.

According to an embodiment, in the memory zone or outside PUF, the variations in roughness are less than 0.1 nm; in the PUF zone, the variations in roughness are comprised between 0.2 nm and 1 nm.

In addition, two oxide layer portions corresponding to two memory points of the PUF portion have a dispersion or variation in roughness that is higher than two oxide layer portions corresponding to two resistive memory points of the storage portion.

According to an embodiment, the etching carried out in the memory zone makes it possible to produce a variation in the thickness of the active oxide layer that is less than the variation in thickness obtained in the PUF zone. The active oxide thickness is measured very locally, on a zone of about 10 nm by 10 nm. To have an idea of the thickness obtained, it is possible to have recourse to techniques such as SEM or TEM in order to obtain the highest precision possible. The term "variation in thickness" means the difference in thickness between two oxide layer portions belonging to the same portion of the device, PUF or storage, and corresponding to two memory points of the same portion of the device. Therefore, two memory points of the PUF portion comprise a variation in thickness that is higher than two memory points of the storage portion.

The method according to the invention makes it possible to obtain a high dispersion of the forming voltage in the PUF portion of the device while still retaining a minimal dispersion of the forming voltage in the memory portion of the device.

The method according to the invention furthermore makes it possible to widen the forming voltage range for use in a ReRAM memory plane as a PUF device. Thanks to this, by applying a forming voltage in this enlarged range, it is possible to obtain the formation of substantially half of the resistive memory points of the PUF portion, by obtaining good diversity in response from the PUF portion of the device.

In other terms, the invention makes it possible to obtain an enlarging of the range of the forming voltage curve by lowering its slope. This will make it possible to target 50% of the cells formed and 50% of non-formed cells within a matrix and therefore to obtain good PUF diversity.

The application of the method according to an aspect of the invention makes it possible to avoid the long step of searching for the forming voltage disclosed for example in the article by Tseng and co-authors "Error free Physically Unclonable Function (PUF) with programmed ReRAM using reliable resistance states by Novel ID-Generation method". Indeed, thanks to the method according to the invention, the dispersion of forming voltages in the PUF portion is very high, which facilitates the search for the forming voltage required to obtain the condition for forming substantially 50% of the resistive memory points of the PUF portion.

Another benefit of the method according to the invention is that it makes it possible to obtain a device that has a PUF function in the Silicon component with backend manufacturing.

Thus, as the obtaining of the formation of substantially half the PUF memories is facilitated, the method for manufacturing can easily be automated and is fully compatible with mass production.

According to an embodiment, the etching of the oxide layer in the PUF zone is a plasma etching. Beneficially, using a plasma etching makes it possible to make use of the non-homogeneous distribution of the etching gases inside the etching machine to obtain the dispersion of roughness and thicknesses desired in the PUF zone.

According to an embodiment, the etching of the oxide layer in the Outside-PUF zone is an etching comprising a substep of ion implanting in the active oxide layer in such a way as to form an implanted active oxide sublayer and a substep of cleaning the active oxide layer in such a way as to remove the implanted active oxide sublayer. Beneficially, the technological chaining makes it possible to remove the implanted sublayer with very high precision by obtaining low roughnesses, low dispersions of roughness as well as low dispersions in thickness.

Beneficially, the etching in the Outside-PUF zone is carried out in such a way as to produce variations in thickness of the active oxide layer less than the variations in thickness produced by the etching in the PUF zone.

Beneficially, the step of etching in the PUF zone is preceded by a step of deposition of a protection layer configured to protect the memory zone during the etching in the PUF zone.

Beneficially, the step of etching in the memory zone is preceded by a step of deposition of a protection layer configured to protect the PUF zone during the etching in the memory zone.

Beneficially, the etching of the active oxide layer in the PUF zone of the device is a plasma etching.

Beneficially, the step of etching in the memory zone of the device comprises a substep of ion implanting in the active oxide layer in such a way as to form an implanted active oxide sublayer and a substep of cleaning the active oxide layer in such a way as to remove the implanted active oxide sublayer; according to this embodiment, the substep of ion implanting comprises the implanting of F ions and in that the substep of cleaning the oxide layer is carried out using an HF solution.

Beneficially, the electrode layers are made from Ti or TiN or TaN or W or Pt and in that the active oxide layer is made from $HfO_2$.

Beneficially, the method according to an embodiment of the invention further comprises a step of encapsulating memory points using a dielectric layer.

Beneficially, the step of etching in the memory zone is carried out prior to the step of etching in the PUF zone; alternatively, the step of etching in the PUF zone is carried out prior to the step of etching in the memory zone.

Beneficially, the method according to the invention comprises a step of defining the resistive memory points PUF portion and the storage memory portion, prior to the etching steps.

Beneficially, the method according to the invention comprises a step of making contacts on the two electrodes.

Another aspect of the invention is a microelectronic device comprising a plurality of resistive memory points, a first portion of the resistive memory points being configured to form a physical unclonable function, the resistive memory points of the first portion forming a PUF zone of the device, a second portion of the resistive memory points being configured to provide a memory function to the microelectronic device, the resistive memory points of the second portion forming a memory zone of the device, each resistive memory point comprising a first electrode layer and a second electrode layer, the first and second electrode layer being separated by an active oxide resistive memory layer, the active oxide layer of the memory points of the PUF zone having a dispersion of roughness and a variation in thickness that is higher than the dispersion of roughness and the variation in thickness of the resistive oxide layer of the memory points of the memory zone.

Beneficially, the device according to the invention provides a PUF function integrated into the Silicon component, being suitable for manufacturing of the backend type.

Beneficially, the device according to the invention comprises a wide forming voltage range in the PUF portion, which makes it possible to easily obtain a wide distribution of forming voltages and therefore an effective PUF zone for authenticating the device in a secure manner.

In other terms, two resistive memory points of the PUF portion have a dispersion of roughness that is higher than two resistive memory points of the oxide layer of the storage memory. In the same way, two resistive memory points of the PUF portion have a variation in thickness that is higher than two resistive memory points of the storage portion.

Beneficially, the device according to an embodiment of the invention comprises resistive memory points in the memory portion having a very low dispersion of the physical properties, providing efficient operation as storage memory.

BRIEF DESCRIPTION OF THE DRAWINGS

Other characteristics and benefits of the invention shall appear clearly in the description which is given of it hereinbelow, for the purposes of information and in no way limiting, in reference to the accompany figures, among which:

FIG. 1 diagrammatically shows the steps of the method according to an aspect of the invention;

FIG. 2 diagrammatically shows the operation of a resistive memory point used in an aspect of the invention;

FIG. 3 diagrammatically shows the device according to the invention;

FIG. 4 shows the microelectronic device support used in the invention;

FIG. 5 shows the microelectronic device support used in the invention;

FIG. 6a shows the steps of etching the PUF zone;
FIG. 6b shows the steps of etching the PUF zone;
FIG. 7a shows the steps of etching the PUF zone;
FIG. 7b shows the steps of etching the PUF zone;
FIG. 8a shows the protection of the PUF zone during the etching of the memory portion;
FIG. 8b shows the protection of the PUF zone during the etching of the memory portion;
FIG. 9a shows the result of the step of etching the oxide layer in the memory portion;
FIG. 9b shows the result of the step of etching the oxide layer in the memory portion;
FIG. 10a shows the step of etching electrode layers and of making contacts on the memory points;
FIG. 10b shows the step of etching electrode layers and of making contacts on the memory points;
FIG. 11a shows the step of etching electrode layers and of making contacts on the memory points;
FIG. 11b shows the step of etching electrode layers and of making contacts on the memory points.

DETAILED DESCRIPTION

FIG. 1 shows the method 100 according to an aspect of the invention. The method 100 according to an aspect of the invention comprises a step 101 of providing a support comprising an electrode layer and an active oxide resistive memory layer. The electrode layer and the active oxide resistive memory layer are the first layers of the resistive memory points. The support is common to the PUF portion and to the storage portion of the device. According to an embodiment, the step 100 comprises the deposition of the first electrode layer and the deposition of the active oxide resistive memory layer.

According to an embodiment, the oxide layer is deposited with a thickness greater than the final thickness sought in the resistive memory points. For example, the oxide layer is made from HfO$_2$ and the first electrode layer from TiN.

According to an embodiment, the method 100 further comprises a step 101a of defining the portion of the support that corresponds to the PUF memory points and the portion of the support that corresponds to the storage memory points.

The method 100 according to the invention comprises a step 102 of etching the active oxide resistive memory layer in the PUF zone of the device. The etching 102 is carried out only on the portion of the support corresponding to the PUF zone of the device. According to an embodiment, the method 100 according to the invention further comprises a step 102a of protection of the portion of the support corresponding to the memory zone of the device. Beneficially, this step of protection makes it possible to selectively etch the PUF zone during the step 102.

According to an embodiment, the step 102a is a step of lithography comprising the spreading of a resin, the insolation thereof using a mask and the stripping. Beneficially, this step makes it possible to cover with a resin layer the storage zone which is not etched during the step of first etching 102.

According to an embodiment, the step of etching 102 in the PUF zone of the device is carried out using a plasma etching. Beneficially, the plasma etching results in an increase in the average roughness and maximum roughness as well as an increase in the variation of the roughness between two different portions of the PUF zone. This makes it possible to obtain a variation in roughness between different resistive memory points of the PUF zone and therefore of high dispersion in forming voltage.

In addition, the plasma etching will also induce a non-homogeneity in thickness between two different portions of the PUF zone. This non-homogeneity in thickness is linked to the non-perfectly homogeneous distribution of etching gases inside the reactor of the etching machine. This makes it possible to further increase the dispersion of forming voltages.

For example, starting with a 20 nm thickness of HfO$_2$ and aiming for a thickness to be etched of 10 nm, it is possible to obtain variations in thickness of HfO$_2$ between 2 and 3 nm from one PUF zone to another.

The method 100 according to the invention further comprises a step 103 of etching the active oxide resistive memory layer in the memory zone of the device, the second etching being carried out only on the portion of the support corresponding to the storage memory.

The etching in the memory zone is carried out in such a way as to obtain a storage zone with a roughness, a dispersion of roughness and a variation on thicknesses less than those of the PUF zone.

It is important to note that at this stage of realisation, the thickness of HfO$_2$ in the Outside-PUF zone is too high to guarantee a nominal operation of the OXRAM cells. Indeed, the forming voltage of OXRAM memories increases very quickly according to the thickness of the oxide.

In addition, the fact that in this zone and after the step of etching in the PUF zone 102 there is on the average an oxide thickness that is notably higher than in the PUF zone contributes to more easily identifying the PUF zone, which is not desirable in terms of security.

Beneficially, the step of etching in the memory zone makes it possible to obtain an average oxide thickness similar to that in the PUF zone, but this time by minimising the variations in thickness as much as possible, this in order to guarantee a nominal operation of the OXRAM memories. Furthermore, the step of etching in the memory zone makes it possible to minimise the dispersion of surface roughness over the oxide layer, with the roughness also having an impact on the forming voltage: a surface that has a peak induces a point effect and a breakdown field that is higher at this location and a lower forming voltage.

The step of etching 103 the oxide layer in the memory portion comprises a substep 103a of protection of the PUF zone. Beneficially, the substep 103a makes it possible to selectively etch the storage zone without modifying the PUF zone of the device.

According to an embodiment, the PUF zone is protected, during the substep 103a by a resin via a step of lithography. The same mask as the one used during the step 102a can be used. In this case, a resin with the reversed polarity is required (inverse polarity of that used previously). This makes it possible to prevent extra cost linked to the manufacture of another mask.

According to an embodiment, the step of etching 103 in the memory zone comprises a substep 103b of implanting ions in the active oxide layer in such a way as to form an implanted active oxide sublayer. In this case the method 100 according to the invention further comprises a substep of cleaning 103c the active oxide layer in such a way as to remove the implanted active oxide sublayer.

The chaining of steps 103b and 103c consists of carrying out an implantation, for example made from F, then in cleaning the surface with a diluted HF solution. Examples of conditions for implantation F are as follows: implantation energy of 5 keV, dose ranging from $10^{14}$ atoms/cm$^2$ to $2 \cdot 10^{15}$ atoms/cm$^2$. Example of condition for cleaning: HF 0.05% from 1 mn to 4 mn.

During the step of implantation other elements from the halogen column can be used.

Beneficially, the chaining of the steps 103b and 103c makes it possible to remove the implanted portion of the oxide layer with very high precision.

Beneficially, the implantation non-uniformities are very low and less than 0.5%, which makes it possible to provide, after stripping the implanted portion, very good control of the final thickness of the oxide layer. In addition, wet cleaning makes it possible to maintain the initial roughness, and even improve it, and in no case degrade it.

In other terms, the steps 103b and 103c make it possible to control the impact on the initial roughness of the oxide layer and even to reduce the initial roughness and to perfectly control the final target thickness of the oxide layer in the memory zone.

On the other hand in the PUF zone, it is possible to obtain variations in roughness and a non-uniformity in thickness that are greater in such a way as to obtain a greater dispersion of the forming voltages.

On the average, in the two zones of the device there will not be at all the same levels of average roughness or the same dispersions of roughness.

In addition, there will be on the average the same thicknesses of oxide in the two zones, but not at all the same uniformities.

The method 100 according to the invention further comprises a step 104 of deposition of a second electrode layer. According to an embodiment this step comprises the deposition of a layer made from Ti or TiN or both.

The method 100 according to the invention further comprises a step 105 of etching the first electrode layer, the second electrode layer and the active oxide layer in such a way as to define the plurality of resistive memory points.

Beneficially this step makes it possible to obtain the resistive memory points of the PUF portion and the resistive memory points of the storage portion.

The method 100 according to the invention further comprises a step of encapsulating 106 memory points using a dielectric layer.

According to an embodiment, the step of encapsulating 106 comprises the encapsulation in several dielectric layers. Examples of dielectric materials used during the step 106 are SiN and $SiO_2$.

According to an embodiment of the method 100 according to the invention, the step 102 of etching the oxide layer in the PUF zone is carried out prior to the step 103 of etching the oxide layer in the memory zone. According to another embodiment the step 103 of etching the oxide layer in the memory zone is carried out prior to the step 102 of etching the oxide layer in the PUF zone.

FIG. 2 diagrammatically shows the operation of a resistive memory point comprising a first electrode or top electrode TE, a second electrode or bottom electrode BE, the two electrodes being separated by an active oxide layer O of resistive memory. In its initial state I, the two electrodes are electrically insulated by the oxide layer O. During the so-called "forming" step F, an electrical voltage applied causes the formation of a conductive filament FC that connects the two electrodes. The memory point is then in its low resistance state LRS. The method according to the invention makes it possible to obtain, in the same memory plane, a PUF zone comprising a plurality of memory points having a high dispersion of forming voltages and a memory zone comprising a plurality of memory points that have a very limited dispersion of forming voltages.

The application of a voltage that has a polarity opposite the forming voltage makes it possible to carry out a reset R of the memory point by partially destroying the conductive filament FC. The memory point is then again in its high resistance state. A setting operation S makes it possible to switch the memory point from its high resistance state to its low resistance state thanks to the reconstitution of the conductive filament FC (shown here diagrammatically in the form of a segment but of which the shape can obviously vary).

Another aspect of the invention is the microelectronic device 200 shown in FIG. 3. The device 200 is obtained using the method 100 according to the invention. The device 200 comprises a portion 201 comprising a plurality of resistive memory points intended to provide a memory function and a portion 202 comprising a plurality of resistive memory points intended to provide a PUF function. Two resistive memory points of the PUF portion have a difference in roughness and a difference in thickness of the oxide layer that are higher than two resistive memory points of the memory portion.

Beneficially, the differences in roughness and in thickness of the oxide layer make it possible to obtain a device that comprises at the same time a PUF function and a storage memory function.

FIG. 4 shows a portion of the microelectronic device support provided during the step 101 of the device 100 according to the invention. The support comprises a first layer comprising a first dielectric material D1 and a first metal material M1. The support further comprises a second layer comprising a second dielectric material D2 and a via V1. According to an embodiment the layer D1 can comprise $SiO_2$ and the layer D2 SiN. The via V1 can be metallised with tungsten. M1 corresponds to the metal lines; they can be made from copper, aluminium or any other material that conducts electricity. The via V1 has for object to conduct the current to a microelectronic object. It can be constituted for example from W, TiN or TaN. The dielectric layers have for objective to electrically insulate the different microelectronic devices between them.

FIG. 5 shows that the microelectronic device support further comprises a first electrode layer BE and an active oxide layer O of resistive memory. The via V1 makes it possible to establish an electrical contact between the metal M1 and the first electrode layer BE. According to an embodiment, the first electrode layer BE comprises for example TiN. According to an embodiment the oxide layer O comprises $HfO_2$.

FIG. 6a shows a cross-section view of the device prior to the step 102 of etching in the PUF zone and in correspondence with the PUF portion of the device. FIG. 6b shows a cross-section view of the device prior to the step 102 of etching in the PUF zone and in correspondence with the memory portion of the device. FIG. 6b shows that the memory portion is protected during the etching in the PUF zone by a resin layer R. The resin layer R is deposited for example during the step 102a. The design and the use of a suitable mask make it possible to carry out the resin layer R only in correspondence with the memory portion of the device.

FIGS. 7a and 7b respectively show a cross-section view of the PUF zone and of the memory zone after the step of etching in the PUF zone and after the stripping of the resin layer R. FIG. 7a shows the reduction in thickness of the oxide layer due to the effect of the etching in correspondence with the PUF portion of the device. FIG. 7b shows that the oxide layer O in correspondence with the memory portion is not modified during the step 102 of first etching.

FIGS. 8a and 8b show a cross-section view of the microelectronic device according to the invention prior to the step 103 of etching in the memory zone. FIG. 8a shows that a resin layer R is carried out in correspondence with the PUF zone during the step 103a of protection of the PUF zone. FIG. 8b shows that the resin R does not protect the memory portion during the step of etching 103 in the memory zone.

Beneficially, the step of etching 103 in the memory zone makes it possible to reduce the thickness of the oxide layer O in correspondence with the memory portion of the device. At this stage of realisation, the thickness of $HfO_2$ in the Outside-PUF zone is too high to guarantee a nominal operation of the resistive memory points; indeed, the forming voltage of resistive memories increases very quickly according to the thicknesses of the oxide. This aspect constitutes moreover one of the hard points that blocks the introduction of this type of memory.

In addition, the fact that in this zone, there is on average a thickness of the oxide layer O that is notably higher than in the PUF zone contributes to more easily identifying the PUF zone, which is not desirable in terms of security.

The step of etching 103 in the memory zone therefore makes it possible to have an average thickness of the oxide layer O similar to that in the PUF zone, but this time by minimising the variations in thickness as much as possible, this in order to guarantee a nominal operation of the resistive memory points. In the same way, we wish to not have dispersion in surface roughness on the oxide layer in correspondence with the memory zone, as the roughness also has an impact on the forming voltage: a surface that has a peak induces a point effect and a breakdown field that is higher at this location and a lower forming voltage.

FIGS. 9 and 10 show two images of the oxide layer O respectively before and after the step of etching in the memory zone. These images are obtained by scanning electron microscopy. These images show that, after stripping the implanted portion, a very good control of the final thickness of the oxide layer is obtained. In addition, wet cleaning makes it possible to maintain the initial roughness, and even to improve it, and in no case degrade it.

During the steps 104 of deposition of the second electrode layer TE or top electrode, then 106 of defining memory points, the two PUF zones and memory are treated identically, with the deposition of materials that constitute the top electrode, for example Ti, TiN and the definition of the patterns constituting the memory points in the entire cell. According to an embodiment, a dielectric of the SiN type used as a hard mask can also be used.

FIG. 11b shows the result of the step 106 of encapsulating memory points using a dielectric layer, for example made from SiN. According to an embodiment, vias V1 and V2 can be used to make the contacts on the memory points of the PUF zone and of the memory zone.

The invention claimed is:

1. A method for manufacturing a microelectronic device comprising a plurality of resistive memory points, a first portion of said resistive memory points being configured to form a physical unclonable function, the resistive memory points of said first portion forming a physical unclonable function (PUF) zone of the device, a second portion of said resistive memory points being configured to provide a memory function to the microelectronic device, the resistive memory points of the second portion forming a memory zone of the device, said method comprising:
    providing a support comprising a first electrode layer and an active oxide resistive memory layer;
    etching the active oxide resistive memory layer in the PUF zone of the device;
    etching the active oxide resistive memory layer in the memory zone of the device, said etching in the memory zone of the device being carried out to produce a dispersion of roughness of the oxide layer less than a dispersion of roughness produced by the etching in the PUF zone of the device;
    depositing a second electrode layer, and
    etching the second electrode layer, the active oxide layer and the first electrode layer to define the plurality of resistive memory points.

2. The method for manufacturing a microelectronic device according to claim 1, wherein the etching in the memory zone of the device is carried out to produce variations in thickness of the active oxide layer less than variations in thickness produced by the etching in the PUF zone of the device.

3. The method for manufacturing a microelectronic device according to claim 1, wherein the etching in the PUF zone of the device is preceded by a step of deposition of a protection layer configured to protect the memory zone of the device during the etching in the PUF zone of the device.

4. The method for manufacturing a microelectronic device according to claim 1, wherein the etching in the memory zone of the device is preceded by a step of deposition of a protection layer configured to protect the PUF zone of the device during the etching in the memory zone of the device.

5. The method for manufacturing a microelectronic device according to claim 1, wherein the etching in the PUF zone of the device is a plasma etching.

6. The method for manufacturing a microelectronic device according to claim 1, wherein the etching in the memory zone of the device comprises a substep of ion implanting in the active oxide layer to form an implanted active oxide sublayer and a substep of cleaning the active oxide layer to remove the implanted active oxide sublayer.

7. The method for manufacturing a microelectronic device according to claim 6, wherein the substep of ion implanting comprises the implanting of F ions and wherein the substep of cleaning the oxide layer is carried out using an HF solution.

8. The method for manufacturing a microelectronic device according to claim 1, wherein the electrode layers are made from Ti or TiN or TaN or W or Pt and wherein the active oxide layer is made from $HfO_2$.

9. The method for manufacturing a microelectronic device according to claim 1, further comprising encapsulating memory points using a dielectric layer.

10. The method for manufacturing a microelectronic device according to claim 1, wherein the etching in the memory zone of the device is carried out prior to the etching in the PUF zone of the device.

11. A microelectronic device comprising a plurality of resistive memory points, a first portion of said resistive memory points being configured to form a physical unclonable function, the resistive memory points of said first portion forming a PUF zone of the device, a second portion of said resistive memory points being configured to provide a memory function to the microelectronic device, the resistive memory points of the second portion forming a memory zone of the device, each resistive memory point comprising a first electrode layer and a second electrode layer, the first and second electrode layer being separated by an active oxide resistive memory layer, wherein the active oxide layer of the resistive memory points of the PUF zone has a dispersion of roughness and a variation in thickness that are higher than a dispersion of roughness and the variation in thickness of the resistive oxide layer of the memory points of the memory zone.

* * * * *